April 11, 1944.   C. H. GIBBONS   2,346,132
APPARATUS FOR INDICATING DEPARTURE FROM NORMAL RATE
OF STRAIN OF PROGRESSIVELY STRESSED SPECIMENS
Filed Dec. 18, 1941   3 Sheets-Sheet 1
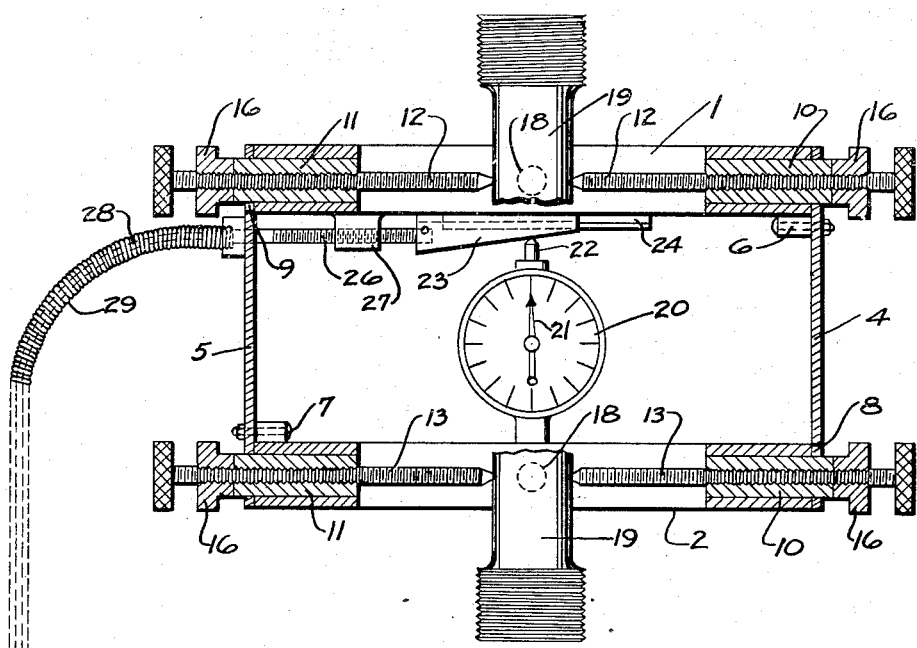
Fig. 1
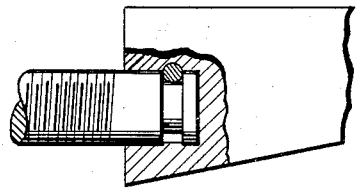
Fig. 2
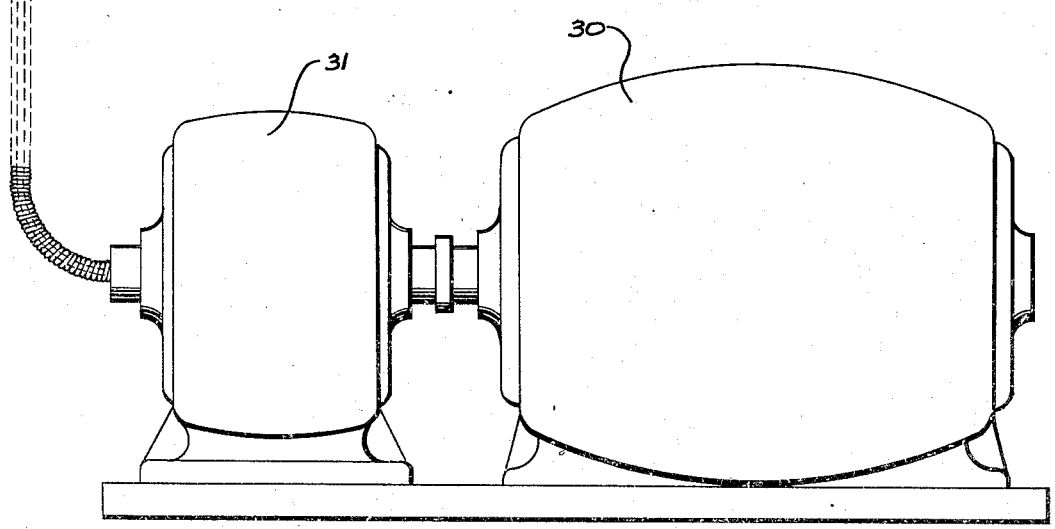
INVENTOR
CHESTER H. GIBBONS
BY
ATTORNEY April 11, 1944.  C. H. GIBBONS  2,346,132
APPARATUS FOR INDICATING DEPARTURE FROM NORMAL RATE
OF STRAIN OF PROGRESSIVELY STRESSED SPECIMENS
Filed Dec. 18, 1941  3 Sheets-Sheet 3
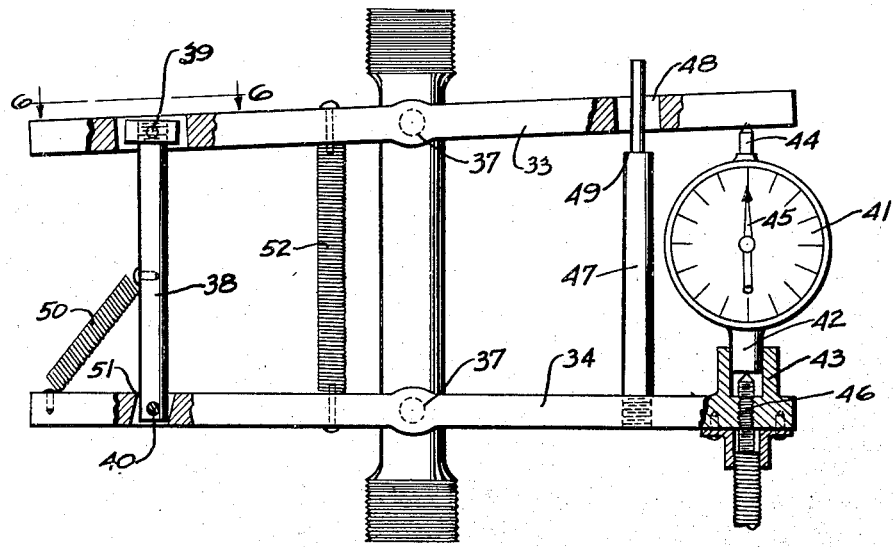
Fig. 5
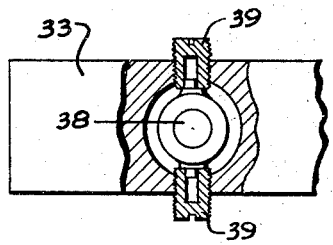
Fig. 6
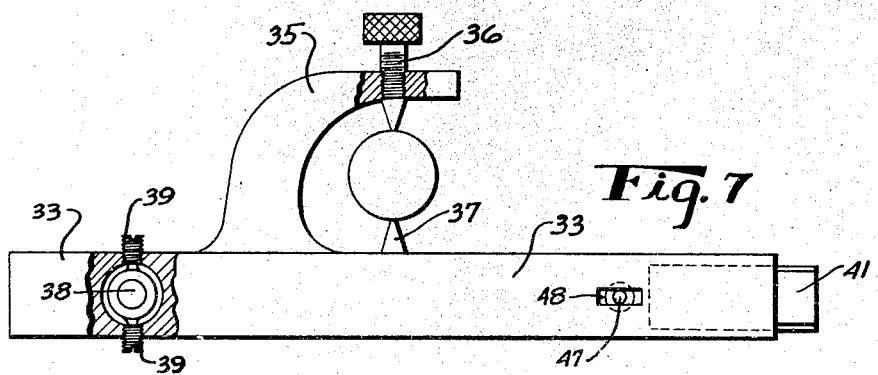
Fig. 7
INVENTOR
CHESTER H. GIBBONS
BY
ATTORNEY Patented Apr. 11, 1944

2,346,132

UNITED STATES PATENT OFFICE 2,346,132

APPARATUS FOR INDICATING DEPARTURE FROM NORMAL RATE OF STRAIN OF PROGRESSIVELY STRESSED SPECIMENS

Chester H. Gibbons, Drexel Hill, Pa., assignor to The Baldwin Locomotive Works, a corporation of Pennsylvania Application December 18, 1941, Serial No. 423,405

6 Claims. (Cl. 265—12)

This invention relates generally to materials testing and more particularly to improved means for obtaining a predetermined rate of strain of a specimen during loading thereof in a materials testing machine.

It has long been desired to load specimens so that their strain increases at a uniform rate. Various arrangements have been heretofore suggested or used in an attempt to approach this desideratum such for instance as moving the loading head of a testing machine at a uniform rate of speed. However, the difficulty with this operation is that slippage in the specimen grips as well as deformation of the testing machine frame and other factors have prevented the uniform rate of head motion being transmitted to the specimen.

It is an object of my invention to provide improved means whereby a specimen may be strained at a predetermined uniform rate regardless of slippage of the specimen in the grips or deformation of the testing machine frame.

Another object is to provide improved apparatus that may be attached directly to a specimen for indicating when the specimen strain varies from a predetermined rate thereby allowing the operator to adjust the load so as to restore the rate of strain to the desired value.

A further object is to provide a relatively simple and comparatively economical apparatus that can be conveniently and effectively mounted upon a specimen for insuring uniform strain thereof.

Other objects and advantages will be more apparent to those skilled in the art from the following description of the accompanying drawings in which:

Fig. 1 is a vertical sectional view taken substantially on the line 1—1 of Fig. 3, but showing the specimen in full elevation and partly broken away for purposes of clarity;

Fig. 2 is an enlarged fragmentary view partly broken away showing a rotatable connection between a rate of strain cam and its operating shaft;

Fig. 5 is a modified form of rate of strain indicating mechanism;

Fig. 6 is a plan view of a pivot connection taken substantially on the line 6—6 of Fig. 5 partially broken away to show details of construction; and Fig. 7 is a plan view of Fig. 5.

Figure 3:
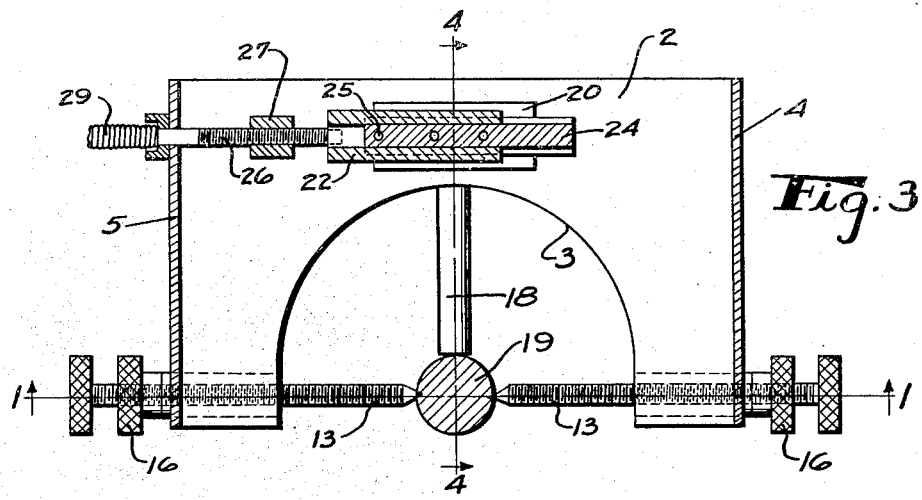
Fig. 3 is a horizontal sectional view taken substantially on the line 3—3 of Fig. 4.
Figure 4:
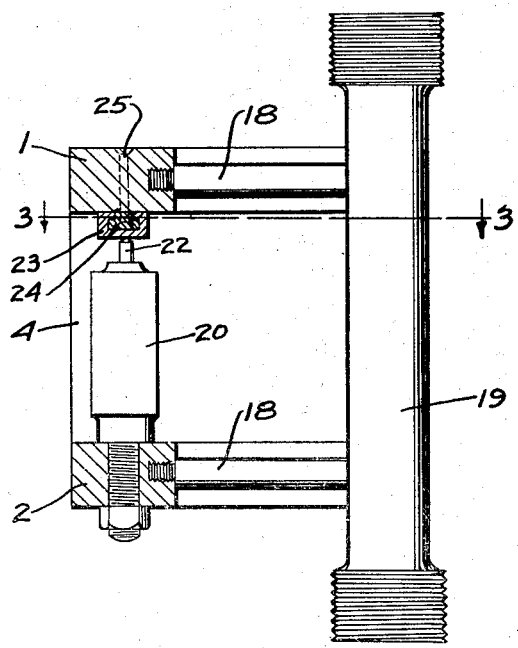
Fig. 4 is a vertical sectional view taken substantially on the line 4—4 of Fig. 3.

In the specific embodiments of the invention such as are disclosed herein merely for the purpose of illustrating the principles of my invention and of showing certain specific forms embodying those principles, I provide, Fig. 1, an extensometer frame having upper and lower heads 1 and 2 which in plan view, Fig. 3, are preferably but not necessarily substantially rectangular in form with cut-out specimen receiving portions 3. These two heads are normally maintained in parallelism by two side plates 4 and 5, the plate 4 being rigidly connected to the upper head by screws or rivets 6 and plate 5 being similarly rigidly connected to the lower head 2 by screws or rivets 7. The lower and upper ends of plates 4 and 5 respectively have vertical slots 8 and 9 receiving suitable guiding bosses 10 and 11 formed as sleeves pressed into suitable openings in the heads. Upper and lower adjustable sets of gauge points 12 and 13 are threaded in the bosses 10 and 11 while lock nuts 16 are adapted to firmly hold the gauge points in any adjusted position. As shown in Fig. 4, stop pins 18 project forwardly from the upper and lower head to center the specimen 19 by engaging the same. The specimen may be of various types and forms but for purposes of illustration it is shown herein as having threaded ends. These ends are received in suitable testing machine grips (not shown) whereby the specimen may be subjected to a tension load or to a compression load if such a test is desired, my rate of strain apparatus being equally applicable to either tension or compression tests.

To accomplish a uniform rate of strain, I mount a well-known Ames dial 20, Figs. 1 and 4, upon the lower head 2 as by a threaded bolt or nut, if desired, or in any other suitable manner. The details of construction and operation of this type of dial are well-known and hence further description thereof is not necessary as it will suffice to state that an indicating hand 21, Fig. 1, rotates in either direction in response to axial movement up or down of a pin 22 slidably mounted in the gauge casing. The pin 22 bears against a cam surface 23 of any predetermined angularity or form and the cam is horizontally slidably mounted on the under side of the upper head 1 so as to move in a direction transversely of pin 22. This cam may be supported in any suitable manner but as shown in Fig. 4 is preferably provided with a T-shaped slot for receiving a T-shaped track 24 suitably riveted at 25 to the head 1. Cam 23 is adapted to be moved along its track at a uniform rate of speed by a screw 26 suitably threaded in a boss 27 formed as a part of head 1. The outer end of this screw is connected to a flexible shaft or wire 28 extending through a flexible coiled casing 29 for connection to a motor 30 which is driven at a uniform speed. The motor is herein shown as connected to a speed reducing gear box diagrammatically indicated at 31 but it will of course be understood that any suitable source of uniform rotating power may be employed regardless of whether the motor is of the electrical, spring or weight type controlled by well-known time clock escapement mechanism for insuring uniform speed. Such clock motors are well-known and may be considered to be diagrammatically represented at 30 and 31, Fig. 1.

In operation of the preferred form, the specimen is loaded by operation of a testing machine which preferably is any one of the various types of hydraulic testing machines wherein fluid pressure is applied from a pump to a main cylinder in which a ram moves upwardly to load the specimen. The rate at which load is applied to the specimen is usually controlled by a valve in the fluid line or by varying the discharge from the pump whereby the loading ram can be moved upwardly at any variable rate necessary to effect a uniform rate of strain in the specimen. To aid the operator in adjusting the loading so that the specimen is strained at a uniform rate, screw 26 is rotated at its uniform speed thereby moving cam 23 transversely over dial pin 22. If the specimen is elongated at the desired rate, then dial 20 moves downwardly with the lower head 2 and cam 23 moves upwardly with head 2 but the transverse movement of the inclined cam surface 23 compensates or makes up for the movement between the heads thereby preventing dial pin 22 from moving relative to the dial casing 20. Hence dial pointer 21 remains in a stationary position and any tendency to move is nullified by the cam action. However, if the specimen is strained too fast, then cam 23 cannot compensate for the excess relative movement between the upper and lower heads and consequently dial pin 22 will move upwardly thereby causing dial hand 21 to move say to the right. This clockwise movement of the dial hand is an indication to the operator that load is being applied too fast for producing the desired rate of strain and accordingly he will reduce the application of power to the testing machine until the hand 21 becomes stationary. The hand may become stationary at any point around the dial without requiring the hand to return to its initial stationary position. Conversely, if the specimen is loaded too slowly to insure uniform rate of strain, then cam 23 will cause the pin to be moved downwardly within the dial casing 20 thereby to move hand 21 in a counterclockwise direction. Upon suitably increasing the testing machine load the rate of strain may be increased until hand 21 is brought to a stationary position thus indicating that the desired rate of strain is being obtained. The desired rate of strain may be initially established by the angularity of the cam 23 or by the rate of rotation of screw 26. The cams may be easily removed and other cams substituted or the motor speed may be varied if desired. While the cam surface is preferably straight to effect a uniform rate of strain, yet if for any reason it is desired to obtain a variable rate of strain, the cam surface may be shaped accordingly.

In the modification of Fig. 5 a pair of upper and lower extensometer arms 33 and 34 have brackets 35, Fig. 7, containing an adjustable gauge point 36 opposed to a stationary gauge point 37. The brackets 35 are open at one end so as to permit the arms to be readily placed around the specimen. The ends of the arms are pivotally connected together by a rod 38, the pivotal connections 39 and 40 being formed in suitable slots within these arms. A strain indicating dial 41 has a shank 42 vertically slidably guided in a boss 43 formed as part of the lower arm 34 while the dial pin 44 is adapted to actuate the dial pointer 45 in the manner described in the preferred form of my invention, the pin 44 being connected to the upper arm 33. The screw 46 is threaded in lower arm 34 and is adapted upon rotation to move dial shank 42 and its dial upwardly at a predetermined rate depending upon the pitch of the screw threads and the rate of screw rotation, this screw being driven by any suitable motor previously referred to. To insure the desired gauge length between the upper and lower sets of gauge points on the arms 33 and 34 a spacer bar 47 is secured to the lower arm 34 and has a reduced portion extending through a slot 48 in the upper arm. Before placing the extensometer arms 33 and 34 on the specimen they are first moved toward each other until the arm engages a shoulder 49 on the spacer bar 47. The other ends of the arms are maintained in their proper relation by the pivot rod 38 and the arms are normally maintained in their spaced relation by a diagonal tension spring 50 which moves arm 38 against a shoulder 51 of the lower arm. A tension spring 52 prevents upper arm 33 swinging freely away from the dial 41 when the apparatus is not in use and yet is not of sufficient tension to unduly restrict pivoting of the arms.

In operation of the Fig. 5 modification, the screw 46 is rotated at a predetermined rate of speed to bodily raise dial 41. If the specimen is strained at the desired rate its gauge points will cause arms 33 and 34 to swing away from each other at the same rate as the dial is bodily moved, thereby preventing dial pin 44 from moving axially relative to the dial mechanism 41. As a result any tendency of hand 45 to move is completely nullified and the hand will not rotate even though it bodily rises with the gauge. If the rate of strain is too fast then the arms will move apart more rapidly than the screw 46 can move the gauge upwardly and accordingly pin 44 will move outwardly from its case to compensate for the differential rate thereby causing rotation of hand 45 in say a clockwise direction. The operator will thereupon reduce the load on the testing machine to reduce the rate of increase of strain until the hand becomes stationary. Conversely, if the rate of strain is too slow, the screw 46 will compress the gauge to move the hand in a counterclockwise direction until the operator increases the load on the machine to bring the hand to a stationary position.

From the foregoing disclosure of the two modifications, it is seen that I have provided an extremely simple and yet highly sensitive and accurate means for determining if a specimen is being strained at a predetermined rate regardless of the deformation of the testing machine frame or slippage of the specimen in the usual testing machine grips and regardless of whether the load is required to be applied at a variable rate. This improved combination permits determination of rate of strain right at the very point where it is of vital interest. The apparatus is relatively inexpensive, is of light weight, compact and easily applied, while at the same time being able to establish the gauge length merely by pressing the upper and lower heads 1 and 2 together until the bottom of slots 8 and 9 are engaged by the gauge point bosses 10 and 11 or until the arm 33 engages the spacer element 37. The cam type gauge provides an extremely simple arrangement for establishing any desired rate of strain merely by providing cams whose surfaces have different degrees of inclination, while the lever type extensometer of Fig. 5 permits the strain of the specimen to be multiplied in its effect on the dial indicator 41.

It will of course be understood that various changes in details of construction and arrangement of parts may be made by those skilled in the art without departing from the spirit of the invention as set forth in the appended claims.

I claim:

1. Apparatus for determining when a specimen loaded in a materials testing machine is subjected to a predetermined rate of strain independently of its relation to stress comprising, in combination, an extensometer mounted on the specimen including an indicating device adapted to be operated when the specimen strain varies from the desired rate, power means continuously operable at a uniform rate, and means driven by said power means for preventing the operation of said indicating device so long as the specimen is strained at the predetermined rate of strain regardless of its relation to stress created in the specimen during loading thereof.

2. Apparatus for determining when a specimen loaded in a materials testing machine is subjected to a predetermined rate of strain independently of its relation to its own stress comprising, in combination, an extensometer connected to the specimen including an indicating device having a movable element normally displaceable in proportion to the strain of said specimen, and means for modifying the movement of said element in either one of opposite directions or for allowing the element to remain stationary depending upon whether the specimen is being strained at said predetermined rate including power means continuously operable at a uniform rate for preventing movement of said element when the specimen is strained at said predetermined rate regardless of its relation to stress created in the specimen during loading thereof and for effecting movement of said element in one or the other of opposite directions when the rate of strain is above or below said predetermined rate.

3. The combination set forth in claim 1 further characterized in that the extensometer has a frame with relatively movable upper and lower elements and the indicating element is supported between said portions and is adapted to be actuated in response to relative movement between the same when the specimen is strained above or below a predetermined rate.

4. The combination set forth in claim 1 further characterized in that the extensometer has upper and lower portions movable in response to strain of the specimen and the indicating device engages one of said portions, and said device also has an extensible element adapted to have a constant or variable length engageable with the other of said portions, and the means for preventing operation of the indicating device includes movable means interposed between said device and one of said portions whereby the continuous operation of the power means when driven at a uniform rate of speed causes the length of said extensible element to be maintained at a constant length so long as the specimen is strained at the predetermined rate or to have an increased or decreased length in response to a rate of strain above or below said predetermined rate of strain.

5. Apparatus for determining when a specimen loaded in a materials testing machine is subjected to a predetermined rate of strain independently of its relation to stress comprising, in combination, an extensometer frame connected to a specimen and having upper and lower portions relatively movable in response to strain of the specimen, a rotatable pointer and dial type gauge having an axially movable pin for rotating said pointer in either of opposite directions, means for supporting said dial between said portions, power means continuously driven at a uniform rate of speed independently of the rate at which load is applied to the specimen, and a continuously rotatable screw supported by said extensometer and driven by said power means for maintaining the dial pin in a constant axial position so long as the specimen is strained at a predetermined rate and adapted to allow said pin to move axially in one or the other of opposite directions when the specimen is strained at a rate above or below said predetermined rate.

6. Apparatus for determining a predetermined rate of strain in a specimen adapted to be loaded in a materials testing machine comprising, in combination, an extensometer frame mounted upon a specimen and having upper and lower relatively movable portions, a rotatable pointer and dial type gauge having an axially movable pin for actuating said pointer, means for supporting said dial by one of said extensometer portions, a cam supported by the other of said portions and movable transversely of said dial pin to maintain the same in a constant axial position so long as the specimen is strained at a predetermined rate, and means for moving said cam at a predetermined rate independently of the rate at which load is applied to the specimen whereby said pin and pointer are maintained at constant positions so long as the specimen is strained at said predetermined rate of strain and said pin and pointer are moved in either one of opposite directions in response to strain of the specimen at rates above or below said predetermined rate.

CHESTER H. GIBBONS.